United States Patent
Hong et al.

(10) Patent No.: US 11,050,690 B2
(45) Date of Patent: Jun. 29, 2021

(54) METHOD FOR PROVIDING RECORDING AND VERIFICATION SERVICE FOR DATA RECEIVED AND TRANSMITTED BY MESSENGER SERVICE, AND SERVER USING METHOD

(71) Applicant: Coinplug, Inc., Gyeonggi-do (KR)

(72) Inventors: Jay Wu Hong, Seoul (KR); Joon Sun Uhr, Gyeonggi-do (KR); Joo Han Song, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 200 days.

(21) Appl. No.: 16/317,098

(22) PCT Filed: Jul. 12, 2017

(86) PCT No.: PCT/KR2017/007447
§ 371 (c)(1),
(2) Date: Sep. 5, 2019

(87) PCT Pub. No.: WO2018/012871
PCT Pub. Date: Jan. 18, 2018

(65) Prior Publication Data
US 2019/0386940 A1    Dec. 19, 2019

(30) Foreign Application Priority Data

Jul. 14, 2016   (KR) .................. 10-2016-0088987

(51) Int. Cl.
*H04L 12/58*   (2006.01)
*G06F 16/182*  (2019.01)
*H04L 9/06*    (2006.01)

(52) U.S. Cl.
CPC ........ *H04L 51/046* (2013.01); *G06F 16/1834* (2019.01); *H04L 9/0631* (2013.01);
(Continued)

(58) Field of Classification Search
CPC ....... H04L 51/04; H04L 51/046; H04L 51/02; H04L 51/00
See application file for complete search history.

(56) References Cited

U.S. PATENT DOCUMENTS 9,584,493 B1 *  2/2017  Leavy .................... G06F 16/22
9,590,956 B1 *  3/2017  Ryan .................... G06F 21/602
(Continued)

FOREIGN PATENT DOCUMENTS

KR    1020090002258 A    1/2009
KR    1020140094282 A    7/2014
(Continued)

*Primary Examiner* — Jeong S Park
(74) *Attorney, Agent, or Firm* — Husch Blackwell LLP

(57) ABSTRACT

The present invention, when at least one from among chat participants requests recording of data generated by the chat participants in an environment in which a messenger bot participates in a chat, registers at least a portion of the generated data as recorded data in a database, provides a transaction ID indicating location in the database of the data registered therein to at least one participant from among the chat participants, determines, in response to a recorded data-related verification request, whether input data included in the verification request corresponds to the recorded data, and, if the input data corresponds to the recorded data, then concludes the recorded data-related verification to have been successful.

25 Claims, 7 Drawing Sheets

(52) U.S. Cl.
CPC .......... *H04L 9/0637* (2013.01); *H04L 9/0643* (2013.01); *H04L 51/02* (2013.01); *H04L 51/10* (2013.01); *H04L 51/16* (2013.01)

(56) References Cited

U.S. PATENT DOCUMENTS

| | | | | |
|---|---|---|---|---|
| 2006/0161666 | A1* | 7/2006 | Cohen | H04L 12/1831 709/229 |
| 2007/0053308 | A1* | 3/2007 | DuMas | H04L 45/00 370/254 |
| 2007/0143401 | A1* | 6/2007 | Lance | H04L 12/1822 709/204 |
| 2008/0189367 | A1* | 8/2008 | Okumura | H04L 51/02 709/204 |
| 2009/0300362 | A1* | 12/2009 | Shaik | H04L 9/002 713/176 |
| 2011/0022839 | A1* | 1/2011 | Hair | H04L 67/104 713/165 |
| 2014/0282083 | A1* | 9/2014 | Gaetano, Jr. | H04L 12/1822 715/752 |

FOREIGN PATENT DOCUMENTS

| | | |
|---|---|---|
| KR | 1020140143298 A | 12/2014 |
| KR | 1020150108097 A | 9/2015 |
| KR | 1016264474 B1 | 6/2016 |

* cited by examiner

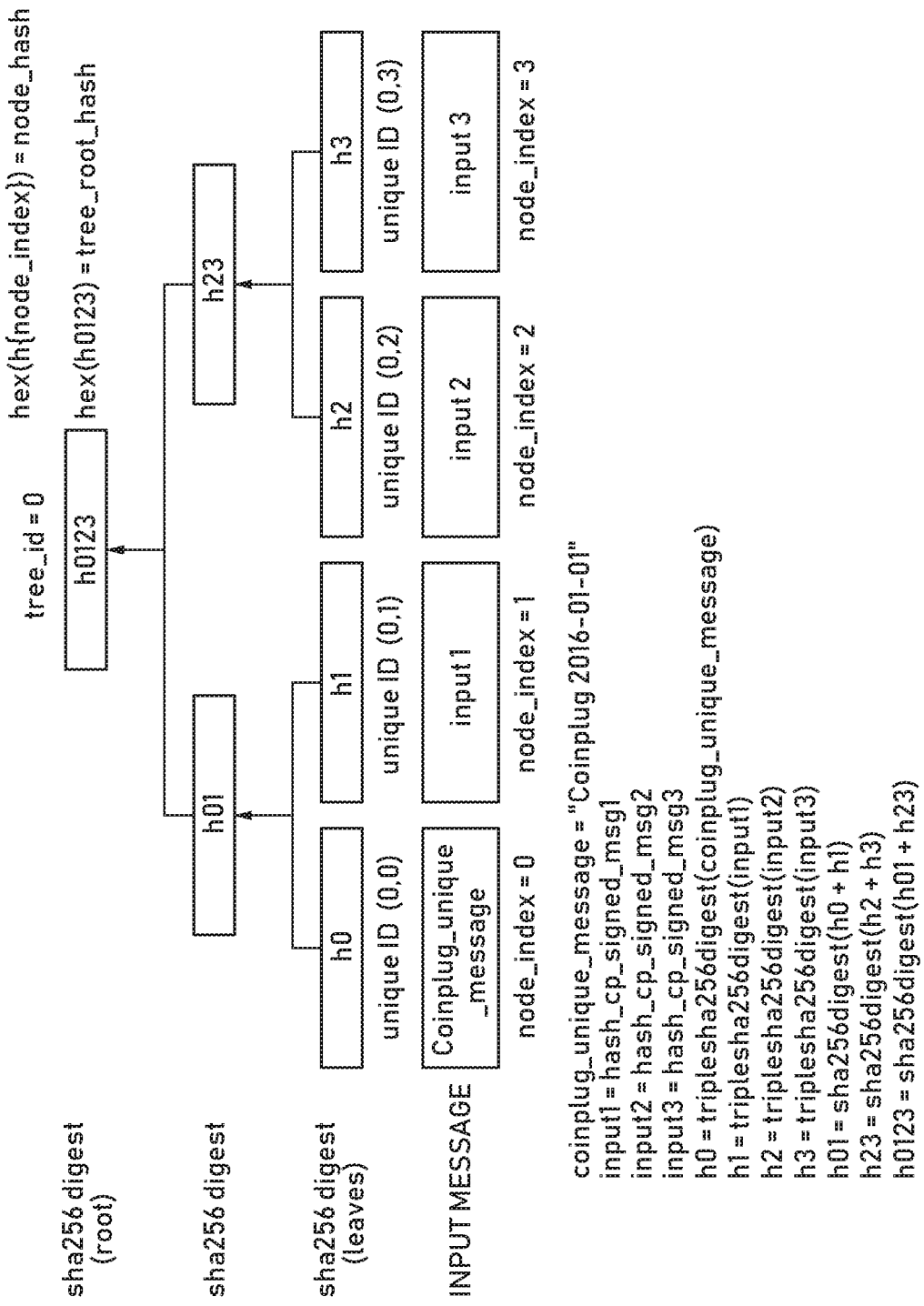

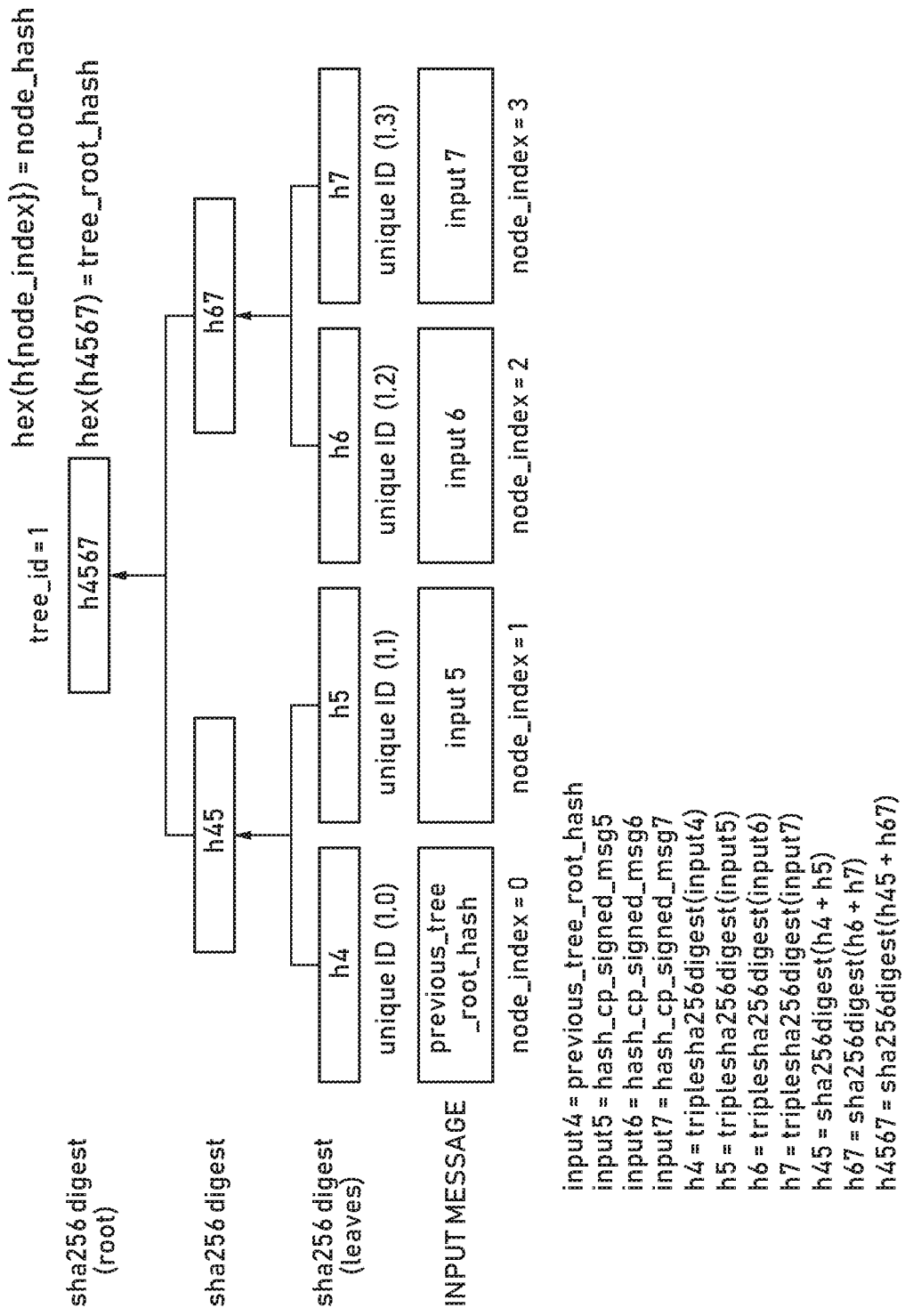

METHOD FOR PROVIDING RECORDING AND VERIFICATION SERVICE FOR DATA RECEIVED AND TRANSMITTED BY MESSENGER SERVICE, AND SERVER USING METHOD

FIELD OF THE DISCLOSURE

The present disclosure relates to a method for providing a recordation service and a verification service of data transmitted and received through a messenger service; and more particularly, to the method for (1) providing the recordation service of data transmitted and received through the messenger service including steps of, if at least one call to a messenger bot from at least one of chat participants having a chat via the messenger service is detected, engaging or supporting another device to engage the messenger bot in the chat, and if it is detected that at least one of the chat participants sends at least one recording request for recording chat data generated by at least one of the chat participants, registering or supporting another device to register at least part of the chat data in a database as record data in response to the recording request, and providing or supporting another device to provide at least one of the chat participants with at least one chat-transaction ID representing at least one location of the chat data in the database, and providing the verification service of the data transmitted and received through the messenger service including steps of, (2) on condition that the server has engaged or supported another device to engage a messenger bot in a chat in response to at least one call to the messenger bot from at least one of chat participants having the chat via the messenger service, and that the server has recorded at least part of chat data generated by at least one of the chat participants as record data in a database in response to a recording request of the chat data by at least one of the chat participants, acquiring a verification request for verifying the record data, and if input data included in the verification request is determined as corresponding to the record data, determining or supporting another device to determine that a verification related to the record data is completed, and the server using the same.

BACKGROUND OF THE DISCLOSURE

A messenger is software that can transmit and receive data including messages in real-time over a network, and is also called an 'instant messenger' as a meaning that the messenger delivers the data instantly. A service provided to transmit and receive data in real-time over the network using the messenger is referred to as a 'messenger service'. When users use the messenger service, the users can immediately and mutually check whether another user is connected to the network, i.e., on-line, and vice versa, thus responses can be received immediately. In addition, the number of its users has increased recently because it allows data including the messages to be exchanged even while a computing device is being used for other purposes as well as a messaging purpose, and is faster than electronic mails.

The computing device capable of using the messenger service includes a mobile device such as a smart phone, a personal digital assistant (PDA), a tablet PC, etc., therefore, not only text messages but also various electronic documents, music, and large-sized video files can be transmitted and received using the computing device.

Thanks to such versatility and convenience, private agreements through the messenger service have been constantly made. However, since agreements or contracts through the messenger service are in the form of digital data, and legal effects of the digital data are not readily recognized in many countries, there was a problem that the agreements or the contracts through the messenger service hardly constitute binding contracts. For example, since there was a problem of verification or proof, legal activities such as real estate lease agreements or loan agreements have not been made through the messenger service.

In Korea, these restrictions were lifted with the recent revision of the legislation. According to the Article 313 of the Korean Criminal Procedure Law revised on May 29, 2016, information such as texts, photos and videos stored in information storage media can be accepted as a statement, and even when the author of the statement denies the statement, the information can be accepted as evidence when the authenticity of the establishment of the statement is proved by objective methods such as digital forensics and appraisal based on scientific analysis results.

Therefore, the inventors of the present disclosure propose a technique for recording digital data related to a contract, on the easily usable messenger service, such that it is legally effective, mathematically verifiable, unlikely to be forged, and can be verified at a later time.

SUMMARY OF THE DISCLOSURE

It is an object of the present disclosure to solve all the aforementioned problems.

It is another object of the present disclosure to allow chat participants using a messenger service to easily establish arrangements, contracts, agreements, etc., without any spatial constraints.

It is still another object of the present disclosure to allow the agreements, the contracts, etc. to be stored and archived for evidential purpose, to be secured and prevented from being forged and falsified, by using hashing functions and cryptographic technology and to be verified scientifically and objectively.

It is still yet another object of the present disclosure to provide a method for cryptographical proof based on chat data on the messenger service by using blockchain technology.

In order to accomplish objects above and characteristic effects to be described later of the present disclosure, distinctive structures of the present disclosure are described as follows.

In accordance with one aspect of the present disclosure, there is provided a method for providing a recordation service of data transmitted and received through a messenger service, including steps of: (a) a server, if at least one call to a messenger bot from at least one of chat participants having a chat via the messenger service is detected, engaging or supporting another device to engage the messenger bot in the chat; and (b) the server, if it is detected that at least one of the chat participants sends at least one recording request for recording chat data generated by at least one of the chat participants, registering or supporting another device to register at least part of the chat data in a database as record data in response to the recording request, and providing or supporting another device to provide at least one of the chat participants with at least one chat-transaction ID representing at least one location of the chat data in the database.

As one example, the step of (b) includes steps of: (b1) the server, if the record data or its at least one message digest is acquired, registering or supporting another device to register (i) a hash value of an encrypted record data generated by encrypting the record data with (i-1) a private key of the server, or (i-2) at least one private key of at least one of the chat participants and the private key of the server, or (ii) a hash value of an encrypted message digest generated by encrypting the message digest with (ii-1) the private key of the server or (ii-2) the private key of said at least one of the chat participants and the private key of the server, in the database; and (b2) the server acquiring at least one hash-transaction ID representing at least one location of the registered hash value in the database.

In accordance with another aspect of the present disclosure, there is provided a method for providing a verification service of data transmitted and received through a messenger service, including steps of: (a) a server, on condition that the server has engaged or supported another device to engage a messenger bot in a chat in response to at least one call to the messenger bot from at least one of chat participants having the chat via the messenger service, and that the server has recorded at least part of chat data generated by at least one of the chat participants as record data in a database in response to a recording request of the chat data by at least one of the chat participants, acquiring a verification request for verifying the record data; and (b) the server, if input data included in the verification request is determined as corresponding to the record data, determining or supporting another device to determine that a verification related to the record data is completed.

As one example, at the step (b), if one of (i) a hash value of an encrypted input data generated by encrypting the input data with one of (i-1) a private key of the server, or (i-2) at least one private key of at least one of the chat participants and the private key of the server, and (ii) a hash value of an encrypted message data generated by encrypting a message digest of the input data with one of (ii-1) the private key of the server, or (ii-2) the private key of at least one of the chat participants and the private key of the server, corresponds to the record data, the server determines or supports another device to determine that the verification related to the record data is completed.

In accordance with still another aspect of the present disclosure, there is provided a server for providing a recordation service of data transmitted and received through a messenger service, including: a communication part for detecting at least one call to a messenger bot from at least one of chat participants having a chat via the messenger service and detecting that at least one of the chat participants sends at least one recording request for recording chat data generated by at least one of the chat participants; and a processor for performing processes of (I) engaging or supporting another device to engage the messenger bot in the chat, (II) registering or supporting another device to register at least part of the chat data in a database as record data in response to the recording request, and (III) providing or supporting another device to provide at least one of the chat participants with at least one chat-transaction ID representing at least one location of the chat data in the database.

In accordance with still yet another aspect of the present disclosure, there is provided a server for providing a verification service of data transmitted and received through a messenger service, including: a communication part for, on condition that the server has engaged or supported another device to engage a messenger bot in a chat in response to at least one call to the messenger bot from at least one of chat participants having the chat via the messenger service, and that the server has recorded at least part of chat data generated by at least one of the chat participants as record data in a database in response to a recording request of the chat data by at least one of the chat participants, acquiring a verification request for verifying the record data; and a processor for performing processes of, if input data included in the verification request is determined as corresponding to the record data, determining or supporting another device to determine that a verification related to the record data is completed.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIGS. 6 and 7 are drawings schematically illustrating an example of Merkle trees created in accordance with one example embodiment of the present disclosure.

DETAILED DESCRIPTION OF THE PREFERRED EMBODIMENTS

Figure 1:
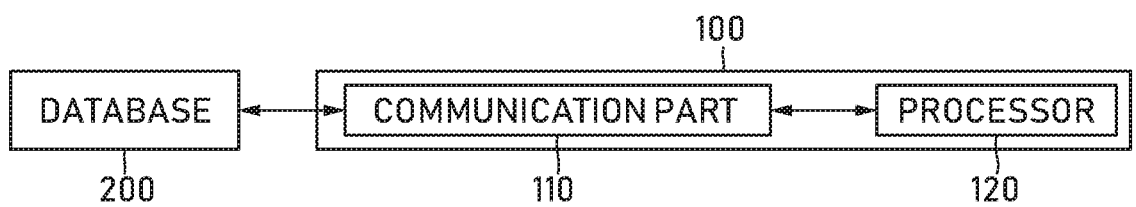
FIG. 1 is a block diagram schematically illustrating a configuration of a server that provides a recordation service and a verification service of data transmitted and received by using a messenger service in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Unless otherwise noted in this specification or clearly contradicted in the context, an item indicated in the singular includes those in the plural, unless otherwise required in the context. To allow those skilled in the art to the present disclosure to be carried out easily, the example embodiments of the present disclosure by referring to attached diagrams will be explained in detail as shown below.

Figure 2:
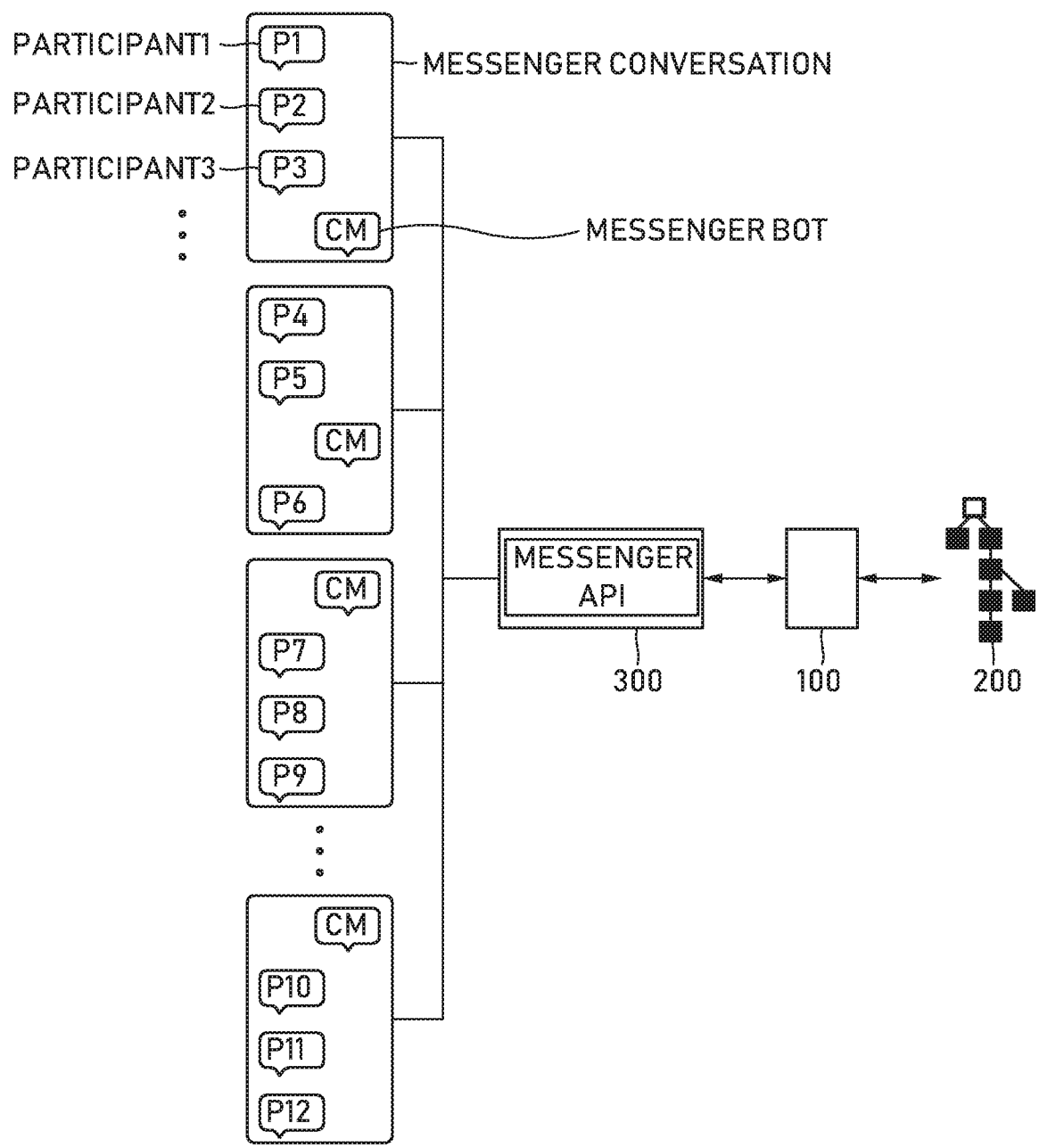
FIG. 2 is a conceptual diagram schematically illustrating a configuration of an entire system while the recordation service and the verification service of the data transmitted and received through the messenger service are used in accordance with one example embodiment of the present disclosure.

FIG. 1 is a block diagram schematically illustrating a configuration of a server that provides a recordation service and a verification service of data transmitted and received by using a messenger service in accordance with one example embodiment of the present disclosure, and FIG. 2 is a conceptual diagram schematically illustrating a configuration of an entire system while the recordation service and the verification service of the data transmitted and received through the messenger service are used in accordance with one example embodiment of the present disclosure.

Throughout the present specification, data transmitted and received via the messenger service may include at least part of texts, images, sounds, and videos, but the scope of the present disclosure is not limited thereto, and may include anything which can be expressed as data.

Also, throughout the present specification, a term 'bot' is a means, commonly implemented as software, functioning as an agent imitating other programs or users. As one example, a 'search bot', i.e., a web crawler, visits websites periodically and fetches contents to be used for a search engine to perform indexing. A messenger bot in the present specification is a means for providing the chat participants using the messenger service with services. The messenger bot may be implemented, in general, by using a messenger Application Programming Interface (API) prepared by a messenger service provider who provides the messenger service. In particular, the messenger bot in the present specification may function as a session in the messenger service like any other chat participants do, more specifically, if the messenger bot engages as a session in a live chat, the messenger bot may detect and process data transmitted and received among the chat participants in the live chat, and the messenger bot may function as kind of an interface between the chat participants and the server of the present disclosure.

The present disclosure assumes a presence of the messenger API for convenience of explanation, however, those skilled in the art understand that even if the messenger service provider does not provide the messenger API, it does not mean that the messenger bot cannot be implemented.

Expressions used in the present specification for explanation of each example embodiment are defined as follows. A left hand side of ':' shows an expression, and a right hand side thereof shows a definition.

<Definition of Expressions>

PrivX: Private key of X
PubX: Public key of X
AESX: AES secret key of X
SigPrivX(Y): Output of ECDSA or RSA signature of Y using PrivX
VerPubX (Y): Output result of SigPrivX (Y) verification using PubX (True or False)
EncPrivX(Y): Output of ECC or RSA encryption of Y using PrivX
DecPubX(Y): Output of ECC or RSA decryption of Y using PubX
EncAESX(Y): Output of AES encryption of Y using AESX
DecAESX(Y): Output of AES decryption of Y using AESX
Hash(Y): triple sha256(Hash value of Y)
SigECC256PrivX(Y): ECC256 Signature of Y using PrivX
VerECC256PubX(Y): ECC256 signature verification of Y using PubX First, a process of providing the recordation service of the data transmitted and received through the messenger service is described by referring to FIGS. 1 to 4.

By referring to FIG. 1, the server 100 in accordance with the present disclosure may include a communication part 110 and a processor 120. Each server described in each example embodiment may be configured separately, however, for convenience of explanation, the service is described as provided by the same server 100. The server 100 may be connected with a database 200, and the database 200 may or may not be included in the server 100. Preferably, however, the database 200 may be external to the server, as a blockchain.

Next, by referring to FIG. 2, the chat participants P1 to P12 are shown as transmitting and receiving the data using a messenger service device 300. FIG. 2 also shows the server 100 providing the recordation and the verification services for the data transmitted and received inside the messenger service, via the messenger API. The number of the chat participants may be two in general, however, it may be more than two or may be one.

Also, by referring to FIG. 2, the messenger service is assumed as provided by devices separate from terminals of every chat participant, e.g., by the messenger service device 300, however, the messenger service may be provided over a peer-to-peer (P2P) network of terminals of all of the chat participants.

The communication part 110 aforementioned may be configured as detecting a call to the messenger bot from one of the chat participants in a chat session who are using the messenger service. For example, supposing that the messenger service is provided through the messenger service device 300, the communication part 110 may detect the call to the messenger bot from the messenger service device 300, and supposing that the messenger service is provided by the P2P network, the communication part 110 may detect the call to the messenger bot from at least one of the chat participants. Other functions of the communication part 110 are described as follows, with regard to a method of providing the services in accordance with the present disclosure.

As shown in FIG. 2, on condition that the chat participants are transmitting and receiving the data through the messenger service, if the call to the messenger bot is detected, the processor 120 may engage or support another device to engage the messenger bot in the chat. As another example, if it is detected that at least one chat participant who started the chat among the chat participants invites the messenger bot at a start of the chat, the processor 120 may engage or support another device to engage the messenger bot in the chat.

The messenger bot may function as a session in the messenger service via the messenger API, and may be handled by the processor 120. As a result, the call to the messenger bot as such may be detected as a notification of new session information sent through the messenger service. The messenger bot may function as an interface which provides the recordation and the verification services, in accordance with the present disclosure to be described below, to the chat participants.

Figure 3:
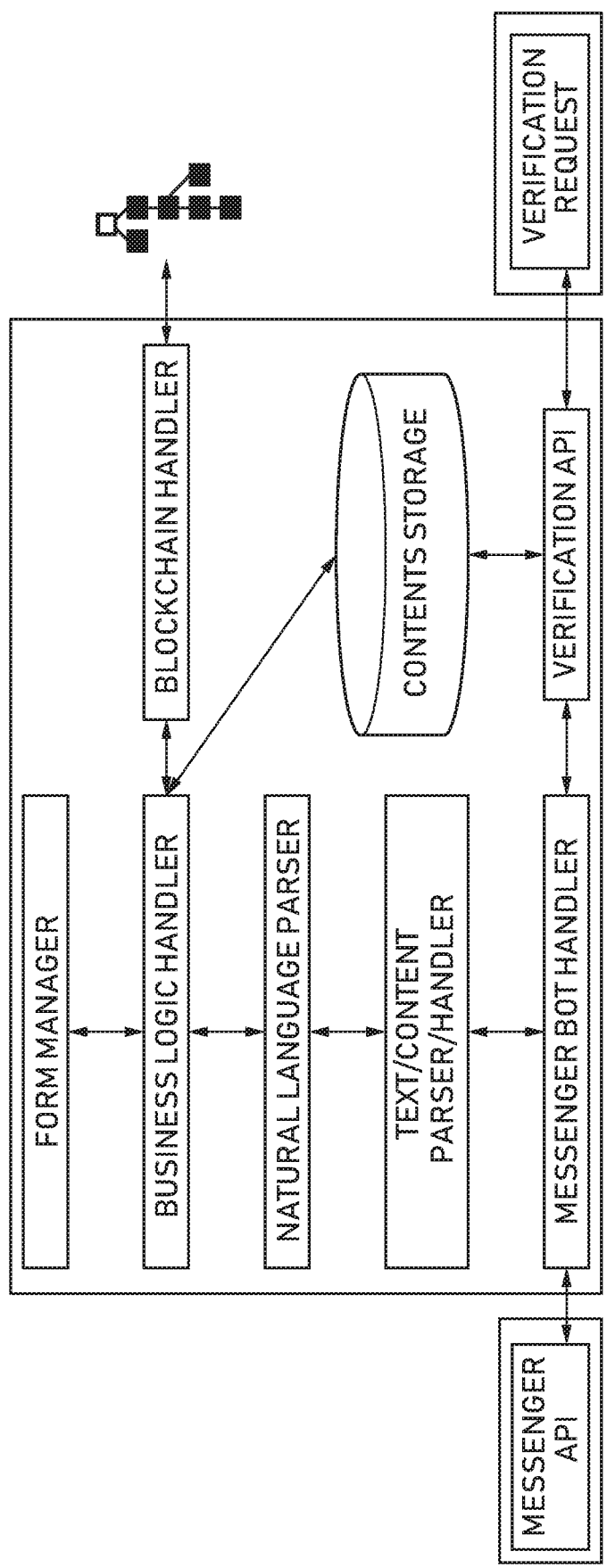
FIG. 3 is a conceptual diagram schematically illustrating an example of a software architecture of the server which provides the recordation service and the verification service of the data transmitted and received through the messenger service in accordance with one example embodiment of the present disclosure.

Next, FIG. 3 is a conceptual diagram schematically illustrating an example of a software architecture implemented by the server which provides the recordation service and the verification service of the data transmitted and received through the messenger service in accordance with one example embodiment of the present disclosure.

By referring to FIG. 3, the server 100 may implement a messenger bot handler by using components of the server 100. The messenger bot handler may handle the messenger bot using the messenger API provided by the messenger service, and the messenger bot handler may transmit and receive chat data to and from the chat participants using the messenger API.

Also, the server 100 may implement a text/content parser/handler using the components of the server 100, and the text/content parser/handler may handle text, images, sounds, and video contents received by the messenger bot handler.

Also, the server 100 may implement a natural language parser using the components of the server 100, and the natural language parser may parse the text received from the text/content parser/handler and perform natural language recognition, to thereby support natural language based commands.

Also, the server 100 may implement a business logic handler using the components of the server 100, and the business logic handler may perform processes like handling, recording, verifying, confirming, etc. of the contents, based on the commands.

Also, the server 100 may implement a form manager using the components of the server 100, and the form manager may provide various forms and rules in response to requests, for supporting the business logic handler in performing the processes like handling, recording, verifying, confirming, etc.

Also, the server 100 may implement a blockchain handler using the components of the server 100, and the blockchain handler may perform anchoring the data, transmitted and received in the messenger service, provided by the business logic handler for the recordation, on the blockchain. Herein, the anchoring may represent activities of associating the data for handling with the blockchain like recording, verifying, etc. of the data retained, stored, or handled by the server 100 in the blockchain which is managed distributively and verified mutually.

Also, the server 100 may implement a verification API module using the components of the server 100, and the verification API module may provide an interface for an external device which requests verification of the chat data.

Figure 4:
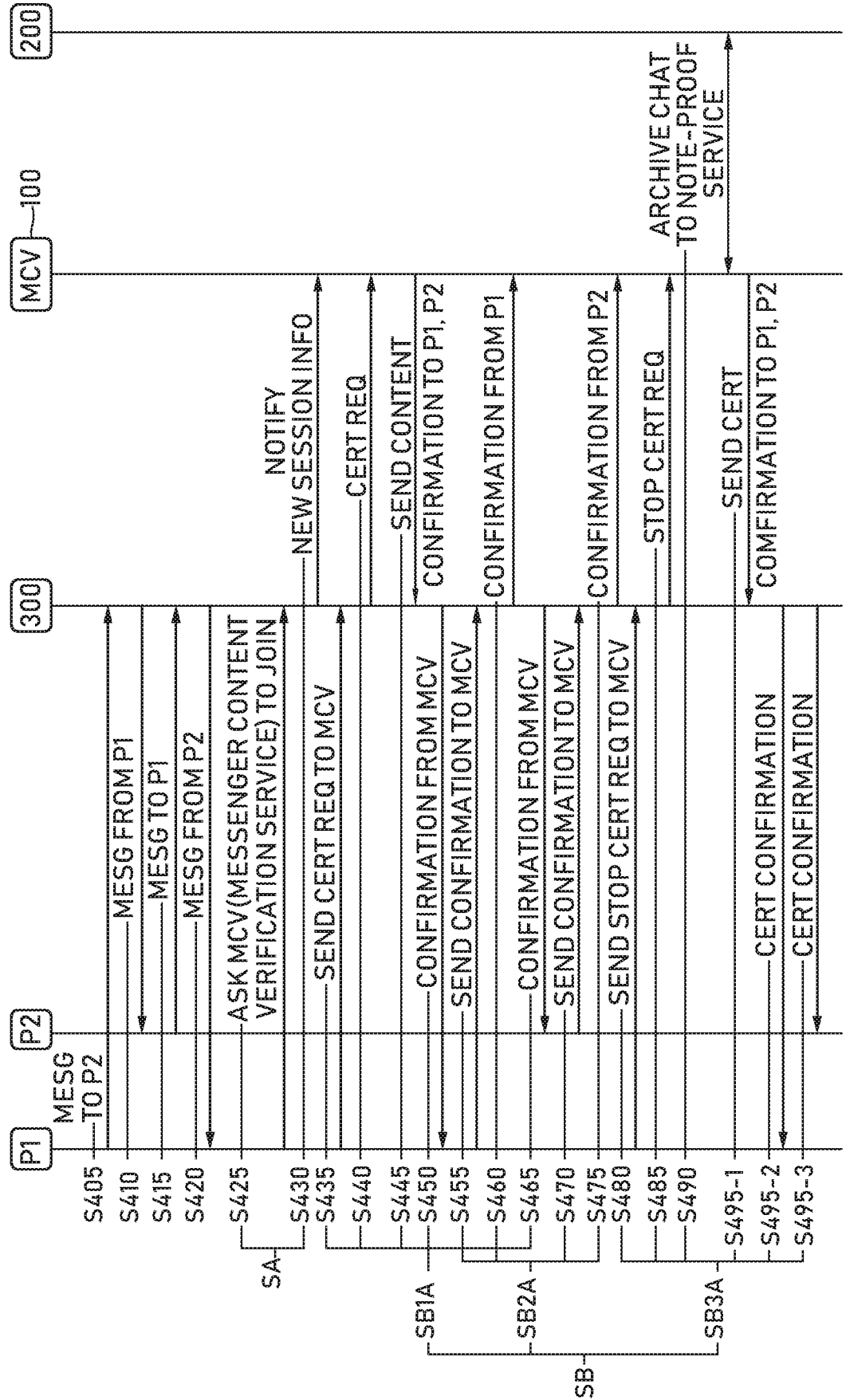
FIG. 4 is a sequence diagram schematically illustrating an example of providing the recordation service and the verification service of the data transmitted and received between two chat participants through the messenger service in accordance with one example embodiment of the present disclosure.

Next, FIG. 4 is a sequence diagram schematically illustrating an example of providing the recordation service and the verification service of the data transmitted and received between two chat participants through the messenger service in accordance with one example embodiment of the present disclosure. By referring to FIG. 4, the messenger service is assumed as provided by the messenger service device 300, however, those skilled in the art can use a method of providing the recordation service in accordance with the present disclosure even when the messenger service is provided over the P2P network.

By referring to FIG. 4, the method of providing the recordation service of the data transmitted and received via the messenger service in accordance with the present disclosure may include a step SA (including S425 and S430) of the server 100 engaging or supporting another device to engage the messenger bot in the chat if at least one call to the messenger bot from at least one of n (where n is a natural number) chat participants Pi (i≤n, where i is a natural number) having the chat via the messenger service is detected.

As an alternative of the step SA (S425 and S430), the method of providing the recordation service in accordance with the present disclosure may include one or more steps of the server 100 engaging or supporting another device to engage the messenger bot in the chat if it is detected that at least one chat participant who started the chat among the chat participants invites the messenger bot at a start of the chat.

Next, the method of providing the recordation service in accordance with the present disclosure may further include a step SB (including S435 to S495-3) of the server 100 registering or supporting another device to register at least part of the chat data in the database as record data in response to at least one recording request for recording the chat data generated by at least one of the chat participants if it is detected that at least one of the chat participants sends the recording request, and providing or supporting another device to provide at least one of the chat participants with at least one chat-transaction ID representing at least one location of the chat data in the database.

In one example embodiment, the step SB may include a step SB1A (including S435 to S450, and S465) of the server 100 sending or supporting another device to send, at steps of S445, S450 and S465, inquiring information on whether or not to agree with recording the chat data to all of the chat participants if it is detected at a step of S440 that at least one of the chat participants sends at least one recording request at a step of S435 for recording the chat data generated by at least one of the chat participants, a step SB2A (including S455, S460, S470 and S475) of the server 100 archiving or supporting another device to archive the chat data generated by the chat participants if it is detected at steps of S460 and S475 that all of the chat participants positively respond at steps of S455 and S470 to the inquiring information, and a step SB3A (including S480 to S495-3) of the server 100 registering or supporting another device to register, at a step of S490, at least part of the archived chat data in the database as the record data if it is detected at a step of S485 that at least one of the chat participants requests, at a step of S480, finishing of recording the chat data, and providing or supporting another device to provide, at steps of S495-1 to S495-3, at least one of the chat participants with the chat-transaction ID representing the location of the chat data registered in the database.

More specifically, steps of S405 to S420 before the step of SA shows exemplarily n of the chat participants Pi who are chatting through the messenger service in FIG. 4. Specifically, a first chat participant P1 may transmit the chat data to the messenger service device 300 at the step of S405, and the messenger service device 300 may transmit the chat data to a second chat participant P2 at a step of S410. Then, in response, P2 may transmit other chat data to the messenger service device 300 at a step of S415, and the messenger service device 300 may transmit said other chat data to P1 at a step of S420.

During the chat as such, P1 may want to store and archive contents of the chat, e.g., the data transmitted and received through the messenger service. If P1 calls the messenger bot for engaging in the chat at a step of S425, the messenger service device 300 may transmit a notification of new session information to the server 100 at a step of S430, and may allow the server 100, which detected the notification, to engage or support another device to engage the messenger bot in the chat.

On condition that the messenger bot has engaged in the chat, if P1 transmits the recording request, i.e., a certification request, to the messenger service device 300 at a step of S435, and if the messenger service device 300 transmits the recording request to the server 100 at a step of S440, then if the server 100 detects the recording request, and if the server 100 transmits information, to be used for instructing the messenger service device 300 to send inquiring information on whether or not to agree with recording the chat data to all of the chat participants P1 and P2, to the messenger service device 300 at a step of S445, then the messenger service device 300 may send the inquiring information on whether or not to agree, to the chat participants P1 and P2, at steps of S450 and S465. Inquiries on whether or not to agree and their corresponding responses of each of the chat participants may occur at a same time or different times. If each of the chat participants receives the inquiring information on whether or not to agree, and transmits data of positive response to the messenger service device 300 at steps of S455 and S470, then the messenger service device 300 which received said data of the positive response may notify the server 100 of the positive response at steps of S460 and S475. The server 100 may archive or support another device to archive the data generated by the chat participants from this time, and the archived data may include data generated after a step S475 at which the server 100 confirms whether or not to agree with the recording, but the scope of the present disclosure is not limited thereto, and may include data generated before a time at which the server 100 confirms whether or not to agree with the recording, as long as the messenger service permits.

Thereafter, while the chat by the chat participants is in session, if a fact that at least one of the chat participants, e.g., P1, requests finishing of the recording is transmitted to the messenger service device 300 at a step of S480, and if the messenger service device 300 transmits said fact to the server 100 and the server 100 detects that at least one of the chat participants has requested finishing of the recording at a step of S485, then the the server 100 may register or support another device to register at least part of the chat data archived till then in the database as the record data at a step of S490. Thereafter, the server 100 may transmit at least one chat-transaction ID representing at least one location of the chat data registered in the database to the messenger service device 300 as certification confirmation information at a step of S495-1, and the messenger service device 300 which received the chat-transaction ID may provide the chat participants with the chat-transaction ID as the certification confirmation information at steps of S495-2 and S495-3.

As another example embodiment, the step of SB may include a step SB1B (not illustrated) of the server 100, if at least one predefined type of a form selected by at least one of the chat participants is detected, sending or supporting another device to send one or more inquiries included in the form according to the selected predefined type to all of the chat participants through the messenger service, a step SB2B (not illustrated) of the server 100 archiving or supporting another device to archive adapted response data which is generated by adapting response data to the form if the response data, corresponding to the inquiries, from at least one of the chat participants is detected, and a step SB3B (not illustrated) of the server 100 registering or supporting another device to register at least part of the archived chat data in the database as the record data if it is detected that at least one of the chat participants has requested finishing of recording the chat data or that all of the inquiries included in the form have been answered to, and providing or supporting another device to provide at least one of the chat participants with the chat-transaction ID representing the location of the chat data registered in the database.

Herein, the predefined type of a form may be, e.g., a form of a contract like a rental agreement, a loan agreement (an IOU), an employment contract, an undertaking contract, but the scope of the present disclosure is not limited thereto.

For example, if the type of the loan agreement is selected, the inquiries included in the contract may include a lender, a borrower, an amount of money which is a subject of the loan, a date of loan, a date of repayment, an interest, etc. If the server 100 displays each of the inquiries on a display of the messenger by way of the messenger bot, the chat participants will respond to each of the inquiries, and the response data may be short text appropriate to each of the inquiries, but the scope of the present disclosure is not limited thereto. For example, the response data may be text composed of natural language sentences used by people in common conversation regarding each of the inquiries, and it may even be sound data of the natural language sentences voiced by the chat participants if the messenger service supports it. The sound data as such may be converted into natural language text by the text/content parser/handler implemented by the server 100, and may be adapted to a type of a form by the natural language parser also implemented by the server 100 according to each of the inquiries. If it is determined that the natural language parser cannot adapt the sound data to the inquiries, the server 100 may display the inquiries on the display of the messenger.

As another example, if a customer A wants a refund from a company B, the customer A may select a form customized to the refund, to thereby start a chat with a customer support or the messenger bot of the company B. In this case, the customer support may request the messenger bot to prepare a refund form of the company B, and if the customer provides information according to the refund form, to thereby complete the refund form, then the completed refund form may be data to be stored in the database 200.

In still another example embodiment describing a recordation mechanism of the record data in more detail, the step SB may include a step SB1 (not illustrated) of the server 100, if the record data or its at least one message digest is acquired, registering or supporting another device to register (i) a hash value of an encrypted record data generated by encrypting the record data with (i-1) a private key of the server, or (i-2) at least one private key of at least one of the chat participants and the private key of the server, or (ii) a hash value of an encrypted message digest generated by encrypting the message digest with (ii-1) the private key of the server or (ii-2) the private key of said at least one of the chat participants and the private key of the server, in the database, and a step SB2 (not illustrated) of the server 100 acquiring at least one hash-transaction ID representing at least one location of the registered hash value in the database.

Preferably, before the step of SB1, a step SB0 (not illustrated) of the server 100, if the record data is acquired, generating or supporting another device to generate the message digest MD=Hash(data) of the record data by using a hash function may further be included. Herein, types of the hash function are not limited. For example, the hash function may be triple sha256. Also, in the present specification, the hash function may generally mean a function for converting original data, however, in an extreme case, may include a function that simply returns the original data without any processing. In this case, the message data generated by applying the hash function may be identical to the original data.

At the step of SB0, in response to the recording request, the message digest of the generated record data may be transmitted to at least one {Pi} of the chat participants. Herein, {Pi} may represent a set whose elements are Pi. Specifically, the message data of the generated record data may be transmitted devices used by {Pi}.

After the step of SB0, the server 100 may acquire from {Pi} an encrypted message digest Sig{PrivPi}(MD) generated by encrypting the message digest with the private key {PrivPi} of {Pi} at a step of SB01 (not illustrated). Herein, Sig{PrivPn} may be a simple representation of a composite function SigPrivPn(SigPrivP n−1( . . . (SigPrivP1) . . . )). In addition to this, the message digest and the public key {PubPi} of {Pi} may be received from {Pi}.

Also, at the step of SB1, if the encrypted message digest generated by encrypting the message digest with the private key of at least one of the chat participants is acquired, the server 100 may verify the encrypted message digest by using at least one public key corresponding to the private key of said at least one of the chat participants.

If the encrypted message digest is determined as valid, the server 100 may generate or support another device to generate (i) the hash value of the encrypted record data generated by encrypting the record data in sequence with the private key of said at least one of the chat participants and the private key of the server, or (ii) the hash value of the encrypted message digest generated by encrypting the message digest of the record data in sequence with the private key of said at least one of the chat participants and the private key of the server. And, the server may register or support another device to register the hash value generated as such in the database. Herein, data is registered in the database 200 in a form of hash values as such in order to reduce sizes of the data due to a limit on storage, etc. of the database 200. Herein, the database 200 may be the blockchain. For example, it may be a bitcoin blockchain. A blockchain server 200 may be a distributive system whose node is composed of an individual computing device, and may be a distributive system composed of multiple nodes. For example, in the case of the bitcoin blockchain, the server that processes the blockchain is a huge distributed system with a large number of nodes globally distributed.

For reference, in the present specification, the description uses expressions SigPriv(data) and SigPub(data) which represent signing data with a private key or a public key, however, these may be substituted by expressions EncPriv (MD) and EncPub(MD) which represent encrypting message digests with a private key or a public key.

Continuing the description, if the encrypted message digest is determined as valid, the server 100 may register or support another device to register (i) the hash value of the encrypted record data generated by encrypting the record data in sequence with the private key of said at least one of the chat participants and the private key of the server, or (ii) the hash value of the encrypted message digest generated by encrypting the message digest of the record data in sequence with the private key of said at least one of the chat participants and the private key of the server, in the database. That is, at least one {Pi} of the chat participants may sign with his/her own private key first and then the server 100 may sign with its private key, and its resulting hash value may be registered in the database 200. As another example, a sequence of signing may be different from this. Specifically, it may be implemented that the server 100 signs first, and then {Pi} signs. Also, the sequence of signing by and among {Pi} may be different.

At the step of SB2, next of the step SB1, the server 100 may acquire or support another device to acquire at least one hash-transaction ID Txid representing at least one location of the registered hash value in the database 200.

Also, if the encrypted message digest is determined as valid, the server 100 may store or support another device to store the record data. Herein, the record data may be encrypted by using a symmetric-key algorithm such as Advanced Encryption Standard (AES). In this case, an encryption key may be a specific encryption key processed from the public key of {Pi}, but the scope of the present disclosure is not limited thereto. Also, the server 100 may attach signature information, generated by using the private key of {Pi} and the private key PrivC of the server 100, to the record data and store them.

The server 100 may store or support another device to store (i) at least one public key {PubPi} of said at least one {Pi} of the chat participants, (ii) the message digest MD of the record data, (iii) the encrypted record data Sig{PrivPi} (data) generated by encrypting the record data with the private key of said at least one {Pi} of the chat participants, (iv) the acquired hash-transaction ID TxID, and (v) the record data EncAESC(data). Also, the server may further store or support another device to store part of the encrypted record data SigPrivC(Sig{PrivPi}(data)), or its hash value, generated by encrypting the record data in sequence with the private key of said at least one of the chat participants and the private key of the server 100.

If the record data is registered in the database 200 as above, the server 100 may transmit a response representing successful registration of the record data to said at least one of the chat participants.

Figure 5:
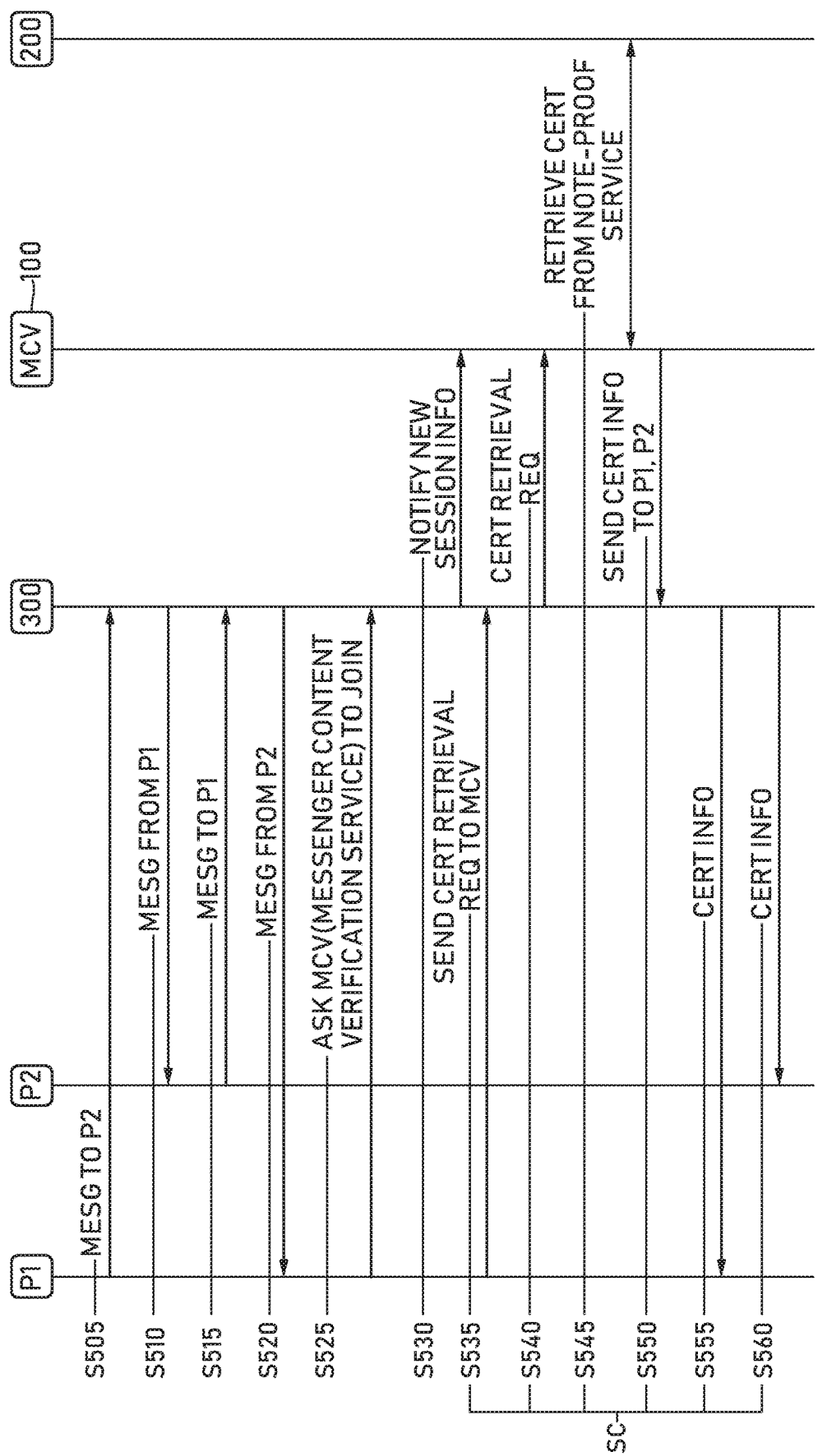
FIG. 5 is a sequence diagram schematically illustrating an example of accessing stored data when providing the recordation service and the verification service of the data transmitted and received between the two chat participants through the messenger service in accordance with one example embodiment of the present disclosure.

Next, FIG. 5 is a sequence diagram schematically illustrating an example of accessing stored data when providing the recordation service and the verification service of the data transmitted and received between the two chat participants through the messenger service in accordance with one example embodiment of the present disclosure.

By referring to FIG. 5, the method of providing the recordation service in accordance with the present disclosure may further include a step SC (including S535 to S560) of the server 100 retrieving the record data from the database 200 by referring to the chat-transaction ID included in an access request, i.e., certification retrieval request, related to the record data, at a step of S545 if the access request is acquired at steps of S535 and S540, and transmitting or supporting another device to transmit the retrieved record data, i.e., certification information, to the chat participants at steps of S550 to S560.

Also, in accordance with the present disclosure, the method of providing the verification service of the transmitted and received data via the messenger service is disclosed, and this method is performed on condition that at least part of the data generated by the chat participants have been registered in the database as the record data. First, the method of providing the verification service in accordance with the present disclosure may include a step SD (not illustrated) of the sever 100 acquiring a verification request related to the record data.

Also, the method of providing the verification service in accordance with the present disclosure may further include a step SE (not illustrated) of the server 100 determining or supporting another device to determine that a verification related to the record data is completed if input data included in the verification request is determined as corresponding to the record data.

The input data may include at least part of (i) the record data as data to be used for verification as to whether it corresponds to the record data registered in the database, (ii) the message digest of the record data as a message digest to be used for verification as to whether it corresponds to the record data registered in the database, and (iii) a record-transaction ID issued during registration of the record data.

Also, determination of whether the input data corresponds to the record data at the step of SE may be determination of whether a specific hash value corresponds to the record data. Herein, the specific hash value may be (i) a hash value of an encrypted input data generated by encrypting the input data with (i-1) a private key of the server or (i-2) at least one private key of at least one of the chat participants and the private key of the server, or (ii) a hash value of an encrypted message digest generated by encrypting the message digest with (ii-1) the private key of the server or (ii-2) the private key of said at least one of the chat participants and the private key of the server.

In that case, more specifically, the step of SD may include a step SD1 of the server 100, if the verification request related to the record data is acquired, referring to a certain transaction ID related to the record data, and a step SD2 of the server 100 acquiring an OP message from the database by referring to the certain transaction ID. At the step of SE, if the specific hash value is determined as corresponding to a hash value included in the OP message, the server 100 may determine or support another device to determine that the verification related to the record data is completed.

However, in cases of the aforementioned example embodiments, the OP message is generated for each data and registered in the blockchain, therefore, a bottle neck in the service may occur when transaction requests build up, and a cost and a resource for service management may become high because the transaction fee must be paid every time.

Hereinafter, the method of the recordation and the verification services is described that gives unforgeability, makes use of advantage like the recordation and the verification in real-time of the transmitted and received data via the messenger service, compensates for the above-mentioned disadvantage and guarantees a fast service when the requests for service pile up, and reduces the cost and resource consumption. Such a method uses a distinct data structure managed by the server 100, different from that in the aforementioned example embodiment.

If the record data or its at least one message digest is acquired and at least one anchoring condition is satisfied, the server 100 may register or support another device to register a representative hash value or its processed value generated by using both a specific hash value and its corresponding at least one neighboring hash value in the database 200, where the specific hash value may be one of (a) a hash value of an encrypted record data generated by encrypting the record data with the private key of the server, (b) a hash value of the encrypted record data generated by encrypting the record data with at least one private key of at least one of the chat participants and the private key of the server, (c) a hash value of an encrypted message digest generated by encrypting the message digest with the private key of the server, and (d) a hash value of the encrypted message digest generated by encrypting the message digest with the private key of said at least one of the chat participants and the private key of the server.

That is, if the anchoring condition is satisfied, the server 100 may generate or support another device to generate the representative hash value by using both (i) one of (a) to (d) above and (ii) its corresponding at least one neighboring hash value, and may register or support another device to register the generated representative hash value or its processed value in the database, instead of registering (i) a hash value of the encrypted record data generated by encrypting the record data with the private key {PrivPi} of at least one {Pi} of the chat participants and the private key PrivC of the server 100, or (ii) a hash value of the encrypted message digest generated by encrypting the message digest with the private key {PrivPi} of the at least one {Pi} of the chat participants and the private key PrivC of the server 100 in the database 200 as in the step of S490 in the example embodiment aforementioned. Herein, the database may be a database, e.g., the blockchain, which is not managed by the server 100 such as the database 200 aforementioned, but may be a database managed by the server 100. The present disclosure is described as using the database 200 not managed by the server 100, but the scope of the present disclosure may be applicable to a case of a database managed by the server 100.

The generation of the representative hash value or its processed value using both (i) the specific hash value and (ii) at least one neighboring hash value may be performed by various functions. Assume that the specific hash value is expressed as "input", and at least one of the neighboring hash value is expressed as "x1, x2, . . . , xn", then a representative hash value t may be expressed as a following equation.

$$t = \text{hash}(\text{function}(\text{input}, x1, x2, \ldots, xn))  \quad \text{<Equation>}$$

Herein, the server 100 may store and manage the specific hash value and the at least one neighboring hash value in a certain data structure. Herein, the data structure may vary and one example may be a Merkle tree. In this case, the generation of the representative hash value or its processed value using both (i) the specific hash value and (ii) at least one neighboring hash value may be performed by using the Merkle tree.

That is, the server 100 may create a Merkle tree whose specific leaf node has the specific hash value, and if the anchoring condition is satisfied, the server 100 may register or support another device to register the representative hash value or its processed value in the database 200, where the representative hash value is generated by using both the specific hash value and at least one hash value of at least one neighboring node which corresponds to the node of the specific hash value.

More specifically, (x1) the server 100 may compute (i) the specific hash value and (ii) a hash value allocated to a sibling node of a specific node where the specific hash value is allocated, to thereby acquire a resultant value, and may allocate or support other device to allocate a hash value of the resultant value to a parent node of the specific node. (x2) If the parent node is a root node of the Merkle tree, the hash value allocated to the parent node becomes the representative hash value. (x3) If the parent node is not the root node of the Merkle tree, the server 100 may repeat the process from (x1) to (x3) with the hash value allocated to the parent node as the specific hash value.

And, the sever 100 may register or support another device to register the hash value allocated to the root node of the Merkle tree ultimately as the representative hash value in the database 200. Herein, the processed value of the representative hash value may be registered. For example, a value resulting from applying a hex operation to the representative hash value may be registered.

Meanwhile, a first data structure and a second data structure may be connected in a form of a chain if the server 100 stores the specific hash value and the at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created. The verification of the second data structure will be explained later.

Further, in a case of a first Merkle tree among at least two Merkle trees connected in a form of a chain, a hash value of a certain message data comprised of text, number or symbol or a processed value of the hash value may be allocated to a first leaf node of the first Merkle tree. For example, at a time of creation of the Merkle tree, a hash value of a first input message given by the server 100 may be allocated.

FIGS. 6 and 7 are drawings schematically illustrating an example of Merkle trees created in accordance with one example embodiment of the present disclosure.

FIG. 6 illustrates a Merkle tree with four ($2^2$) leaf nodes. As the illustrated Merkle tree is a first Merkle tree whose tree_id is zero, a hash value (triplesha256digest(coinplug_unique_message)) of a certain message data "Coinplug 2016-01-01" is allocated to an h1 node which is a first leaf node. If there is at least one recording request for the record data, i.e., the recording request related to the data transmitted and received via the messenger service, the server 100 may create a leaf node next to a last leaf node of the Merkle tree currently configured and may allocate the specific hash value or its processed value to the created leaf node. For example, if an allocation of values is completed with the h1 node as a last which is a second leaf node of the Merkle tree in FIG. 6, and if a new leaf node is to be created, then an h2 node which is a next leaf node may be created and a specific hash value or its processed value (triplesha256digest(input2)) may be allocated to an h2 node. Further, the server 100 may calculate or support another device to calculate by using (i) a specific hash value allocated to the h2 node and (ii) a hash value allocated to an h3 node which is a sibling node of the h2 node. The hash value of the computed value may be allocated to an h23 node which is a parent node of the h2 node and the h3 node. As the parent node, i.e., the h23 node, is not the root node of the Merkle tree, the server 100 may repeat the processes above by regarding the hash value allocated to the h23 node as the specific hash value. That is, with the hash value allocated to the h23 node as the specific hash value, the hash values allocated to the h23 node and an h01 node may be used together to be calculated and allocated to an h0123 node which is a parent node of the h23 node and the h01 node. Herein, as the h0123 node is the root node of the Merkle tree, the server 100 may register or support other device to register the processed value hex (h{node_index}) of the hash value allocated to the h0123 node in the database 200.

Meanwhile, the anchoring condition may be one of (i) a condition that a certain number of the record data is acquired or a certain number of the message digest is generated, (ii) a condition that a certain amount of time is elapsed, (iii) a condition that a block is created in the blockchain, and (iv) a condition that has at least one of characteristics of the services.

For example, if the message digests are acquired as many as the number of the leaf nodes of the Merkle tree in response to the multiple recording requests for registration of the record data, at least one hash value of a result of encrypting each of the message digests with the private key of at least one of the chat participants and the private key of the server 100 may be at least one input value, i.e., a value to be allocated to the leaf node, into the Merkle tree aforementioned.

Also, the server 100 may create a root value of the Merkle tree aforementioned at stated intervals, by referring to the condition (ii) above. In this case, if a certain amount of time is elapsed, the server 100 may create a Merkle tree by referring to the input value by then and may register or support other device to register the root value of the Merkle tree in the database 200.

However, in this case, a value may not be allocated to a sibling node of the node to which the specific hash value is allocated even though a certain amount of time is elapsed. In case no hash value is allocated to the sibling node even though the anchoring condition is met, the server 100 may allocate a certain hash value to the sibling node to thereby produce a root value of the Merkle tree by the method aforementioned. For example, the server 100 may copy the specific hash value and allocate or support another device to allocate the specific hash value to the sibling node.

The service characteristics may be at least part of information on cost provided by at least one of the chat participants who sent the recording request for registration of the transmitted and received data, information on a time-zone during which the registration of the record data is performed, information on location where the registration service of the record data is provided and information on a type of a company that requested registration of the record data. However, the scope of the present disclosure is not limited thereto.

Meanwhile, if a creation of a new Merkle tree starts and if the anchoring condition is satisfied without acquisition of the record data or the message digest, the server 100 may create the new Merkle tree by allotting certain message data to its first and second leaf nodes and may register the root value of the new Merkle tree or its processed value in the database 200. In this case, the new Merkle tree with two leaf nodes may be created.

Meanwhile, as aforementioned, a first data structure and a second data structure may be connected in a form of a chain if the server 100 stores the specific hash value and the at least one neighboring hash value in the first data structure and then stores and manages the second data structure identical in a form to the first data structure. Especially, if the first data structure and the second data structure are Merkle trees, a root value of the first data structure or a hash value of the root value may be allocated to a first leaf node of the second data structure.

FIG. 7 is a drawing illustrating an example of a Merkle tree created in a form of the second data structure in accordance with one example embodiment of the present disclosure.

By referring to FIG. 7, it is clear that the root value hex(h0123) of the Merkle tree whose tree_id is 0 in FIG. 6 is allocated to the first leaf node which is an h4 node of a new Merkle tree as triplesha256digest(input4). In such a manner, the present disclosure has advantage of improving data integrity, as tracking becomes easier even in the case of data forgery, by connecting multiple data structures created when a transaction occurs.

Next, the process of verifying the record data registered by using the data structure aforementioned is explained.

On condition that the server 100 has acquired the record data or its at least one message digest, and has registered a first representative hash value or its processed value in the database 200, where the representative hash value aforementioned is referred to as the first representative hash value for convenience of explanation and is generated by using both a first specific hash value and at least one neighboring hash value which corresponds to the first specific hash value under at least one anchoring condition, and where the specific hash value aforementioned is referred to as the first specific hash value for convenience of explanation, and the first specific hash value may be one of (i) a hash value of an encrypted record data generated by encrypting the record data with the private key of the server, (ii) a hash value of the encrypted record data generated by encrypting the record data with at least one private key of at least one of the chat participants and the private key of the server, (iii) a hash value of an encrypted message digest generated by encrypting the message digest with the private key of the server, and (iv) a hash value of the encrypted message digest generated by encrypting the message digest with the private key of said at least one of the chat participants and the private key of the server, then the server 100 may acquire the verification request related to the record data, and if a second representative hash value or its processed value generated by using the input data included in the verification request corresponds to the first representative hash value or its processed value registered in the database 200, the server 100 may determine or support another device to determine that the verification related to the record data is completed.

Herein, the second representative hash value may be generated by using both a second specific hash value and its corresponding at least one neighboring hash value, where the second specific hash value may be one of (i) a hash value of a verification-requested data A included in an encrypted input data generated by encrypting the input data with (i-1) a private key of the server, or (i-2) at least one private key of at least one of the chat participants and the private key of the server, or (ii) a hash value of an encrypted message digest generated by encrypting the message digest of the verification-requested data A with (ii-1) the private key of the server or (ii-2) the private key of said at least one of the chat participants and the private key of the server.

Herein, the input data included in the verification request may include at least one of (i) the data of the verification request, (ii) a message digest of the data of the verification request, or (iii) the record-transaction ID issued at the time of registration of the record data.

If the input data includes the data of the verification request, the message digest of the data of the verification request may be generated by the aforementioned method, and the second specific hash value may be generated based on the message digest. Further, the second representative hash value may be generated by calculation using both the second specific hash value and its corresponding at least one neighboring hash value.

If the input data includes the record-transaction ID issued at the time of registering the record data, the second specific hash value may be set to a value allocated to a leaf node in the Merkle tree created previously, corresponding to the record-transaction ID. In the example of FIGS. 6 and 7, the record-transaction ID may be a unique ID.

The explanation of the first specific hash value aforementioned may be applied to the second specific hash value. That is, the computation of the second specific hash value and at least one neighboring hash value may be performed by various functions. Thus the explanation thereof is omitted by referring to the above.

In this case, the generation using both (i) the second specific hash value and (ii) at least one neighboring hash value may be performed by using the Merkle tree. If the verification request related to the record data is acquired, the server 100 may identify information on the Merkle tree and its leaf nodes related to the input data.

And, the second representative hash value may be generated by using both the second specific hash value and a hash value allocated to at least one other leaf node which matches the node of the second specific hash value in the Merkle tree.

If the service is provided by using the database, e.g., the blockchain, not managed by the server 100, then the server 100 may refer to the certain transaction ID corresponding to the identified information on the Merkle tree and its leaf nodes.

In this case, if the verification request related to the record data is acquired, the server 100 may refer to the certain transaction ID related to the record data, and may acquire or support another device to acquire an OP message from the database 200 by referring to the certain transaction ID. Also, if the second representative hash value or its processed value, generated by using the input data included in the verification request, corresponds to the first representative hash value or its processed value included in the OP message, then the server may determine or support another device to determine that the verification related to the record data is completed.

Meanwhile, the certain transaction ID may be included in the input data. That is, the chat participants may transmit the certain transaction ID to the server 100 at the time of the verification request together with at least one of (i) the data of the verification request, (ii) the message digest of the data of the verification request, or (iii) the record-transaction ID issued at the time of registration of the record data.

In a process of the verification, the server 100 may create or support another device to create a new Merkle tree, by using an existing Merkle tree having been created at the aforementioned process of registration of the record data in the database. That is, the server 100 may (y1) generate or support another device to generate a specific value by using both (i) the second specific hash value and (ii) a hash value allocated to a sibling node of a specific node where the second specific hash value is allocated in the existing Merkle tree, and may allocate or support another device to allocate a hash value of the generated specific value to a parent node of the specific node in a new Merkle tree. Further, the server 100, (y2) if the parent node is the root node of the new Merkle tree, may compare or support another device to compare a hash value allocated to the parent node as the second representative hash value with the value included in the OP message, and (y3) if the parent node is not the root node of the new Merkle tree, may repeat the steps of (y1) to (y3) with a hash value allocated to the parent node as the second specific hash value.

If the root value or its processed value of the ultimately-created Merkle tree corresponds to the first representative hash value or its processed value included in the OP message, the server 100 may determine or support another device to determine that the verification related to the record data is completed.

As such, in the present disclosure, if a Merkle with $n^m$ or N leaf nodes is created at the step of the registration of the record data, fast integrity confirmation of a transaction is possible because a file verification is performed by computation corresponding only to the height of $\log_n N$ or m of the Merkle tree.

Meanwhile, if the input data is acquired, the server 100 may identify at least one of information on a Merkle tree and information on its leaf nodes related to the input data by referring to time information related to the input data.

Hereinafter, the verification process is explained by taking an example illustrated in FIG. 6.

By referring to FIG. 6 again, if verification of input 2 is requested, the server 100 may identify information on the existing Merkle tree and its leaf nodes by referring to information on the input data, and may transmit a certain transaction ID corresponding to the identified information on the existing Merkle tree whose tree_id is zero to the database 200, to thereby acquire the OP message from the database 200. Then, the server 100 may create or support another device to create a new Merkle tree by using the input 2. Because the hash value triplesha256digest(input2) of the input 2 is allocated to the h2 node, the server 100 may calculate by using both (i) the input 2 allocated in a place of a value in the h2 node and (ii) a hash value allocated to an h3 node which is a sibling node of the h2 node in the existing Merkle tree. The hash value of the calculated value may be allocated to an h23 node which is a parent node of the h2 node and the h3 node. Because the h23 node is not the root node of the new Merkle tree, the server 100 may repeat the above processes by regarding the hash value allocated to the h23 node as the second specific hash value. That is, by regarding the hash value allocated to the h23 node as the second specific hash value, the hash values allocated to the h23 node and an h01 node in the existing Merkle tree may be used to calculate a hash value and this hash value may be allocated to an h0123 node which is a parent node of the h23 node and the h01 node. Herein, because the h0123 node is the root node of the Merkle tree, the server 100 may compare or support another device to compare the processed value hex(h{node_index}) of the hash value allocated to the h0123 node with the value included in the OP message.

Meanwhile, the processor 120 aforementioned may control a data flow among a communication part 110 and other components. That is, the processor 120 may control the communication part 110 and said other components to perform their unique functions, by controlling the data flow among each component within the server 100.

The processor 120 may include hardware configuration of MPU (Micro Processing Unit) or CPU (Central Processing Unit), cache memory, data bus, etc. Additionally, OS and software configuration of applications that achieve specific purposes may be further included.

Every example embodiment of the present disclosure has an effect of allowing legally binding verification inside the convenient messenger service and allowing the recordation and verification of data according to various types of forms depending on a purpose of the verification.

Advantage of technology described herein as the example embodiments is that convenience of the present disclosure is improved by supporting easily usable text commands, especially natural language commands, that contents inside the messenger service are allowed to be legally binding by being recorded and archived in a verifiable way, that multiple chatting threads are supported, and verification of various types are supported and also usage statistics of the verification is provided, that preferred option whether to allow a private retrieval or a public retrieval is provided, and that a customized bot service for third parties is provided by using the technology in the present disclosure.

Based on the explanation of the above embodiments, those skilled in the art can clearly understand that the present disclosure may be implemented by combination of software and hardware or hardware alone. The part contributing to the prior art or the object of a technical solution of the present disclosure may be implemented in a form of executable program command through a variety of computer components and may be recorded in computer readable media. The computer readable media may include solely or in combination, program commands, data files, and data structures. The program commands recorded in the media may be components specially designed for the present disclosure or may be known and usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

For example, a service as such may be provided which allows retrieval and/or verification of the data by a user or a third party, where the data transmitted and received inside various SNS services, such as an SNS service provided by Facebook, Inc., may be collected and recorded.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for providing a recordation service of data transmitted and received through a messenger service, comprising steps of:
    (a) a server, if at least one call to a messenger bot from at least one of chat participants having a chat via the messenger service is detected, engaging or supporting another device to engage the messenger bot in the chat; and
    (b) the server, if it is detected that at least one of the chat participants sends at least one recording request for recording chat data generated by at least one of the chat participants, registering or supporting another device to register at least part of the chat data in a blockchain network as record data in response to the recording request, and providing or supporting another device to provide at least one of the chat participants with at least one chat-transaction ID representing at least one location of the chat data in the blockchain network,
    wherein the step of (b) includes steps of:
    (b1) the server, if the record data or its at least one message digest is acquired, registering or supporting another device to register (i) a hash value of an encrypted record data generated by encrypting the record data with (i-1) a private key of the server, or (i-2) at least one private key of at least one of the chat participants and the private key of the server, or (ii) a hash value of an encrypted message digest generated by encrypting the message digest with (ii-1) the private key of the server or (ii-2) the private key of said at least one of the chat participants and the private key of the server, in the blockchain network; and
    (b2) the server acquiring at least one hash-transaction ID representing at least one location of the registered hash value in the blockchain network,
        wherein, before the step of (b1), the step of (b) further includes a step of:
    (b0) the server, if the record data is acquired, generating or supporting another
device to generate the message digest of the record data by using a hash function, and wherein, at the step of (b1), if the encrypted message digest generated by encrypting the message digest with the private key of said at least one of the chat participants is acquired, and if the encrypted message digest is verified by using at least one public key corresponding to the private key of said at least one of the chat participants, the server registers the hash value of the encrypted record data or the hash value of the encrypted message digest in the blockchain network,
    wherein, after the step of (b0), the step of (b) further includes a step of:
    (b01) the server sending or supporting another device to send the generated message digest of the record data to at least one of the chat participants.

2. The method of claim 1, wherein, at the step of (b0), the public key is acquired in addition to the record data.

3. The method of claim 1, wherein, after the step of (b01), the step of (b) further includes a step of:
    (b02) the server acquiring (i) the encrypted message digest generated by encrypting the message digest with the private key of said at least one of the chat participants, (ii) the public key of said at least one of the chat participants, and (iii) the message digest.

4. The method of claim 1, wherein, at the step of (b1), if the encrypted message digest is determined as valid, the server registers or supports another device to register (i) the hash value of the encrypted record data generated by encrypting the record data in sequence with the private key of said at least one of the chat participants and the private key of the server, or (ii) the hash value of the encrypted message digest generated by encrypting the message digest of the record data in sequence with the private key of said at least one of the chat participants and the private key of the server, in the blockchain network.

5. The method of claim 1, wherein, if the encrypted message digest is determined as valid, the server stores or supports another device to store the record data.

6. The method of claim 5, wherein the record data is stored as advanced encryption standard (AES) encrypted.

7. The method of claim 1, wherein the server stores or supports another device to store (i) at least one public key of said at least one of the chat participants, (ii) the message digest of the record data, (iii) the encrypted record data generated by encrypting the record data with the private key of said at least one of the chat participants, (iv) the acquired hash-transaction ID, and (v) the record data.

8. The method of claim 1, wherein, at the step of (a), if it is detected that at least one chat participant who started the chat among the chat participants invites the messenger bot at a start of the chat, the server engages or supports another device to engage the messenger bot in the chat.

9. The method of claim 1, wherein the step (b) includes steps of:
    (b1') the server, if it is detected that at least one of the chat participants transmits the recording request of the chat data generated by the chat participants, sending or supporting another device to send inquiring information on whether or not to agree with recording the chat data to all of the chat participants;
    (b2') the server, if it is detected that all of the chat participants positively respond to the inquiring information, retaining or supporting another device to retain the chat data generated by the chat participants; and
    (b3') the server, if it is detected that at least one of the chat participants requests finishing of recording the chat data, registering or supporting another device to register at least part of the retained chat data in the blockchain network as the record data, and providing or supporting another device to provide at least one of the chat participants with the chat-transaction ID representing the location of the chat data registered in the blockchain network.

10. The method of claim 1, wherein the step (b) includes steps of:
    (b1") the server, if at least one predefined type of a form selected by at least one of the chat participants is detected, sending or supporting another device to send one or more inquiries included in the form according to the selected predefined type to all of the chat participants through the messenger service;
    (b2") the server, if response data, corresponding to the inquiries, from at least one of the chat participants is detected, retaining or supporting another device to retain adapted response data which is generated by adapting the response data to the form; and (b3") the server, if it is detected that at least one of the chat participants requests finishing of recording the chat data or that all of the inquiries included in the form are answered to, registering or supporting another device to register at least part of the retained chat data in the blockchain network as the record data, and providing or supporting another device to provide at least one of the chat participants with the chat-transaction ID representing the location of the chat data registered in the blockchain network.

11. The method of claim 1, wherein, at the step of (a), the call to the messenger bot is detected as a notification of new session information sent through the messenger service.

12. The method of claim 1, wherein the chat data generated by the chat participants includes at least part of one or more texts, one or more images, one or more sounds, and one or more videos.

13. The method of claim 1, wherein the messenger service is provided by a device separate from terminals of all of the chat participants.

14. The method of claim 1, wherein the messenger service is provided over a peer-to-peer (P2P) network of terminals of all of the chat participants.

15. The method of claim 1, wherein the number of the chat participants is equal to or greater than one.

16. The method of claim 1, further comprising a step of:
(c) the server, if at least one access request for accessing the record data is acquired, retrieving the record data from the blockchain network by using the chat-transaction ID included in the access request, and sending or supporting another device to send the retrieved record data to at least one of the chat participants.

17. The method of claim 1, further comprising steps of:
(c) the server, acquiring a verification request for verifying the record data; and
(d) the server, if input data included in the verification request is determined as corresponding to the record data, determining or supporting another device to determine that a verification related to the record data is completed.

18. The method of claim 17, wherein, at the step (d), if one of (i) a hash value of an encrypted input data generated by encrypting the input data with one of (i-1) a private key of the server, or (i-2) at least one private key of at least one of the chat participants and the private key of the server, and (ii) a hash value of an encrypted message data generated by encrypting a message digest of the input data with one of (ii-1) the private key of the server, or (ii-2) the private key of at least one of the chat participants and the private key of the server, corresponds to the record data, the server determines or supports another device to determine that the verification related to the record data is completed.

19. The method of claim 18, wherein the step (c) includes steps of:
(c1) the server, if the verification request for verifying the record data is acquired, referring to a certain transaction ID related to the record data; and
(c2) the server acquiring an OP message from the blockchain network by referring to the certain transaction ID, and
wherein, at the step of (d), if the hash value of the encrypted message data is determined as corresponding to a hash value included in the OP message, the server determines or supports another device to determine that the verification related to the record data is completed.

20. The method of claim 17, wherein, at the step of (d), the input data includes at least part of (i) the record data, (ii) the message digest of the record data, and (iii) a record-transaction ID issued during registration of the record data.

21. A server for providing a recordation service of data transmitted and received through a messenger service, comprising:
a communication part for detecting at least one call to a messenger bot from at least one of chat participants having a chat via the messenger service and detecting that at least one of the chat participants sends at least one recording request for recording chat data generated by at least one of the chat participants; and
a processor for performing processes of (I) engaging or supporting another device to engage the messenger bot in the chat, (II) registering or supporting another device to register at least part of the chat data in a blockchain network as record data in response to the recording request, and (III) providing or supporting another device to provide at least one of the chat participants with at least one chat-transaction ID representing at least one location of the chat data in the blockchain network,
wherein the processor, if the record data or its at least one message digest is acquired, (I) registers or supports another device to register (i) a hash value of an encrypted record data generated by encrypting the record data with (i-1) a private key of the server, or (i-2) at least one private key of at least one of the chat participants and the private key of the server, or (ii) a hash value of an encrypted message digest generated by encrypting the message digest with (ii-1) the private key of the server or (ii-2) the private key of said at least one of the chat participants and the private key of the server, in the blockchain network, and
(II) acquires at least one hash-transaction ID representing at least one location of the registered hash value in the blockchain network
wherein the processor, (i) if the record data is acquired, generates or supports another device to generate the message digest of the record data by using a hash function, and wherein the processor, (ii) if the encrypted message digest generated by encrypting the message digest with the private key of said at least one of the chat participants is acquired, and if the encrypted message digest is verified by using at least one public key corresponding to the private key of said at least one of the chat participants, registers the hash value of the encrypted record data or the hash value of the encrypted message digest in the blockchain network,
wherein the processor sends or supports another device to send the message digest of the generated record data to at least one of the chat participants.

22. The server of claim 21, wherein the at least one public key corresponding to the private key of said at least one of the chat participants is acquired when the record data is acquired, and wherein the processor acquires (i) the encrypted message digest generated by encrypting the message digest with the private key of said at least one of the chat participants, and (ii) the message digest.

23. The server of claim 21, further comprising:
the communication part is further configured to acquire a verification request for verifying the record data; and
a processor for performing processes of, if input data included in the verification request is determined as corresponding to the record data, determining or supporting another device to determine that a verification related to the record data is completed.

24. The server of claim 23, wherein the processor, if one of (i) a hash value of an encrypted input data generated by encrypting the input data with one of (i-1) a private key of the server, or (i-2) at least one private key of at least one of the chat participants and the private key of the server, and (ii) a hash value of an encrypted message data generated by encrypting a message digest of the input data with one of (ii-1) the private key of the server, or (ii-2) the private key of at least one of the chat participants and the private key of the server, corresponds to the record data, determines or supports another device to determine that the verification related to the record data is completed.

25. The server of claim 24, wherein the processor, if the verification request related to the record data is acquired via the communication part, refers to a certain transaction ID related to the record data, and acquires an OP message from the blockchain network by referring to the certain transaction ID, and if the specific hash value is determined as corresponding to a hash value included in the OP message, determines or supports another device to determine that the verification related to the record data is completed.

\* \* \* \* \*